(12) United States Patent
Johnsen et al.

(10) Patent No.: US 7,426,531 B1
(45) Date of Patent: Sep. 16, 2008

(54) DISTRIBUTED ELECTRONIC DATA PROCESSING

(75) Inventors: Petter Johnsen, Grimstad (NO); Per Olav Kroka, Grimstad (NO)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 407 days.

(21) Appl. No.: 09/714,956

(22) Filed: Nov. 20, 2000

(30) Foreign Application Priority Data

Nov. 25, 1999 (NO) .................................. 19995774

(51) Int. Cl.
*G06F 15/16* (2006.01)
*G06F 9/46* (2006.01)
(52) U.S. Cl. ...................................... 709/201; 718/106
(58) Field of Classification Search ......... 709/100–108, 709/201; 379/221; 712/228; 710/14; 711/167
See application file for complete search history.

(56) References Cited

U.S. PATENT DOCUMENTS 4,530,051 A * 7/1985 Johnson et al. ............. 709/203
5,062,040 A * 10/1991 Bishop et al. ............... 709/318

OTHER PUBLICATIONS

Harish Patil and Charles Fischer, "Efficient Run-TIme Monitoring Using Shadow Processing"☐☐Presented at AADEBUG'95(Automated and Algorithmic Debugging),☐☐University of Wisconsin—Madison, pp. 1-14☐☐.*
S.Petri and H.Langendorfer,"Load Balancing and Fault Tolerance in Workstation Clusters Migrating and Groups of Communicating Processes", Oct. 1995, Operating Systems Review, vol. 29, No. 4, pp. 25-36.*
Thu D. Nguyen , John Zahorjan, "Scheduling policies to support distributed 3D multimedia applications", Proceedings of the 1998 ACM SIGMETRICS Joint International Conference on Measurement and Modeling of Computer Systems , pp. 244-253.*

* cited by examiner

*Primary Examiner*—George C Neurauter, Jr.
(74) *Attorney, Agent, or Firm*—Michael Cameron

(57) ABSTRACT

In a distributed processing system of two or more interconnected CPUs or computers, each having an operating system, wherein different processes are assigned to particular CPUs in a static manner for workload distribution, a novel virtual link handler (VLH) comprising shadow processes and driver adapters allow processes resident of and operating on a CPU or computer to exchange signals with processes resident of and operating on other CPUs.

18 Claims, 13 Drawing Sheets

| Processor A PIDs | Shadow PIDs | Address | Processor B PIDs |
|---|---|---|---|
| P1 | sP1 | A | P1' |
| P2 | sP2 | A | P2' |
| P3 | sP3 | A | P3' |
| P4' | sP4 | B | P4 |
| P5' | sP5 | B | P5 |
| P6' | sP6 | B | P6 |
| - | - | B | P7 |

Fig. 8

| Processor A | | |
|---|---|---|
| PIDs | Shadow PIDs | Address |
| P1 | sP1 | A |
| P2 | sP2 | A |
| P3 | sP3 | A |
| P4' | sP4 | B |
| P5' | sP5 | B |
| P6' | sP6 | B |
| - | - | - |

| Processor B | | |
|---|---|---|
| Address | Shadow PIDs | PIDs |
| A | sP1 | P1' |
| A | sP2 | P2' |
| A | sP3 | P3' |
| B | sP4 | P4 |
| B | sP5 | P5 |
| B | sP6 | P6 |
| B | - | P7 |

Fig. 9a

| Processor A | | |
|---|---|---|
| PIDs | Shadow PIDs | Address |
| P1 | sP1 | A |
| P2 | sP2 | A |
| P3 | sP3 | A |
| P4' | sP4 | B |
| P5' | sP5 | B |
| P6' | sP6 | B |

| Processor B | | |
|---|---|---|
| Address | Shadow PIDs | PIDs |
| A | sP1 | P1' |
| A | sP2 | P2' |
| A | sP3 | P3' |
| B | sP4 | P4 |
| B | sP5 | P5 |
| B | sP6 | P6 |

Fig. 9b

| Processor A | |
|---|---|
| PIDs | Shadow PIDs |
| P1 | sP1 |
| P2 | sP2 |
| P3 | sP3 |
| P4' | sP4 |
| P5' | sP5 |
| P6' | sP6 |

| Processor B | |
|---|---|
| Shadow PIDs | PIDs |
| sP1 | P1' |
| sP2 | P2' |
| sP3 | P3' |
| sP4 | P4 |
| sP5 | P5 |
| sP6 | P6 |

Fig. 9c

DISTRIBUTED ELECTRONIC DATA PROCESSING

FIELD OF THE INVENTION

The invention relates to computer systems comprising two or more processing units (CPU), and in particular to inter process communication in such systems wherein sharing of the workload is accomplished by allocating different processes in a static manner to different CPUs that operate autonomously and with operating systems (OS) that do not include known traditional networking capabilities for such inter process communication across the system.

BACKGROUND

In computer systems, meeting the requirements for efficiency and speed can be a problem since a single physical CPU of a typical computer system is only capable of carrying out a single instruction at a time. A commonly employed solution to this problem is to include two or more physical CPUs (or computers) to increase the capacity of the computer system. With more than one CPU in such systems, the various tasks, typically referred to as processes that each would be assigned a unique symbolic process identifier (PID), that essentially comprise the computer programs operated by means of the CPUs, can be distributed among the CPUs to share the workload and to allow that more than one instruction can be carried out at the same time. Typically, in most systems the various processes will need to communicate for different purposes such as information exchange or signals receiving and transmitting, and when different processes are resident of different CPUs, such systems must also include means by which the different processes are allowed to communicate with one another without limiting inter process communication to processes with the same CPU allocation. It should be noted that in such systems it is assumed that the OS or any interrupt routines may also send signals, but only processes can receive signals. When the CPUs or computers of such systems operate autonomously and their OS do not include networking capabilities for "transparent" inter process signals communication across the system, other means for accomplishing inter process communication between processes of different CPUs or computers need to be provided.

Several solutions to facilitate inter process communication in multiprocessor or multi-computer systems of the kind mentioned above are known. Some solutions suggest the use of common memory for such communications, while others suggest the addition of other kinds of coupling between the processors in the system.

U.S. Pat. No. 5,062,040 discloses a multi-processing arrangement to ensure that signals are not lost and that duplicate signals are not processed, and a multiprocessor system being transparent to existing programs. A signal-handling code fragment is always executed on the processor local to the user portion of an extended process. The user's kernel must send the current signal result (that is, whether a signal has been received which is not being ignored) to a stub process with any stub packet, and any updated signal result must be sent to an active stub process, if any non-ignored signals are subsequently received by the user's process before the stub process responds. This is defined as the pseudo-signal state. Each kernel is arranged to maintain a linked list of table entries which have signals to be sent of forwarded and a system process running at base level that removes signals from the list and forwards them to the correct destination via a communication channel to each processor.

Accordingly, it is an object of the present invention to provide an arrangement for inter process communication across a multi-processor system with distributed processing, wherein processor and OS autonomy is maintained and wherein OS common control elements or information is not required.

BRIEF SUMMARY

The above object of the present invention is accomplished by providing a novel virtual link handler (VLH) comprising shadow processes (SP) for actual processes communicating across the system and driver adapters (DA) for communicating CPUs. In an arrangement according to the invention, the symbolic PIDs of resident actual processes of a CPU or computer requiring communication with other resident processes of other CPUs or computers of the system are also defined on such other communicating CPUs or computers, respectively. Accordingly, the symbolic PID of a resident SP of a CPU or computer will be the same as the symbolic PID of a resident actual process of another CPU or computer. Hence, a resident process of a particular CPU, identified by its PID and wishing to communicate a signal to another "remote" resident target process of another "remote" CPU with another PID, will on the CPU on which it resides find a "local" SP with the same symbolic PID as the symbolic PID of the "remote" target process. For exchange of signals, the interface of the local SP to a local communicating actual process appears identical to the interface to actual "remote" target process. The local "SP", however, actually makes no decisions based on the signal, but serves the function of forwarding the received signal to the other CPU to which the "remote" target process is allocated and is operating on. On the receiving CPU, the signal message is received by a similar SP, which in turn forwards the signal to the actual target process. Accordingly, the communication of signals between CPUs or computers of systems according to the invention is facilitated by means of the novel VLH without requiring that the actual processes have any knowledge of the presence of the VLH. As can be seen from the above standing, the SP may serve to receive from a process a signal for forwarding to another CPU or computer as well as to deliver to a process a signal that has been forwarded from another CPU or computer. To communicate signals between the CPUs, the shadow processes on each CPU have interfaces to driver adapters which in turn have interfaces to drivers for the transmission means that provide the channels of the system used to convey messages from a CPU or computer to another.

BRIEF DESCRIPTION OF THE DRAWINGS

FIG. 8 illustrates schematically for the system example of FIG. 7 the relationship for between the PIDs of actual processes, the PIDs shadow processes of respective the processors and their locations, respectively.

FIG. 9 *a-c* illustrates schematically for the system example of FIG. 7 the development of look-up tables.

DETAILED DESCRIPTION OF THE EMBODIMENTS

In the following, by way of examples and with reference to the accompanying drawings, the present invention will be explained in more detail.

Figure 1:
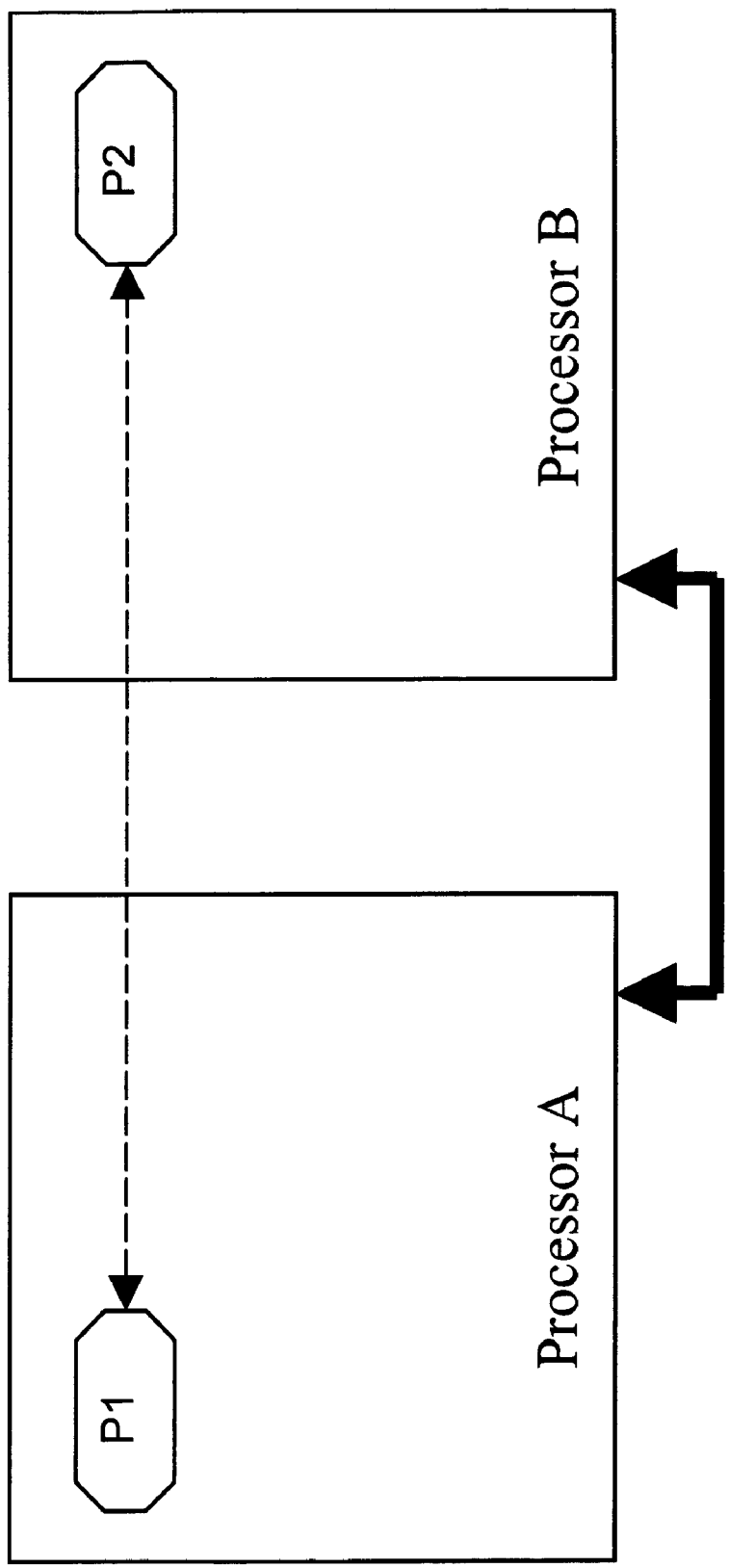
FIG. 1 is a schematic drawing illustrating an example of problem scenario with a system of two CPUs or computers, each with a resident different process requiring to communicate with the other.

In FIG. 1 is shown an example of a typical problem scenario in a system with two processors and with processes P1 and P2 resident and operating on processors A and B, respectively, wherein the processes wish to communicate. The operating system (OS) of each processor enables communication between processes resident and operating on the same processor, but does not provide for communication with processes resident and operating on different processors. Accordingly, in the typical situation shown in FIG. 1, although the processors are provided with physical interconnection for transferring signals, processes P1 and P2 are unable to communicate signals to one another.

Figure 2:
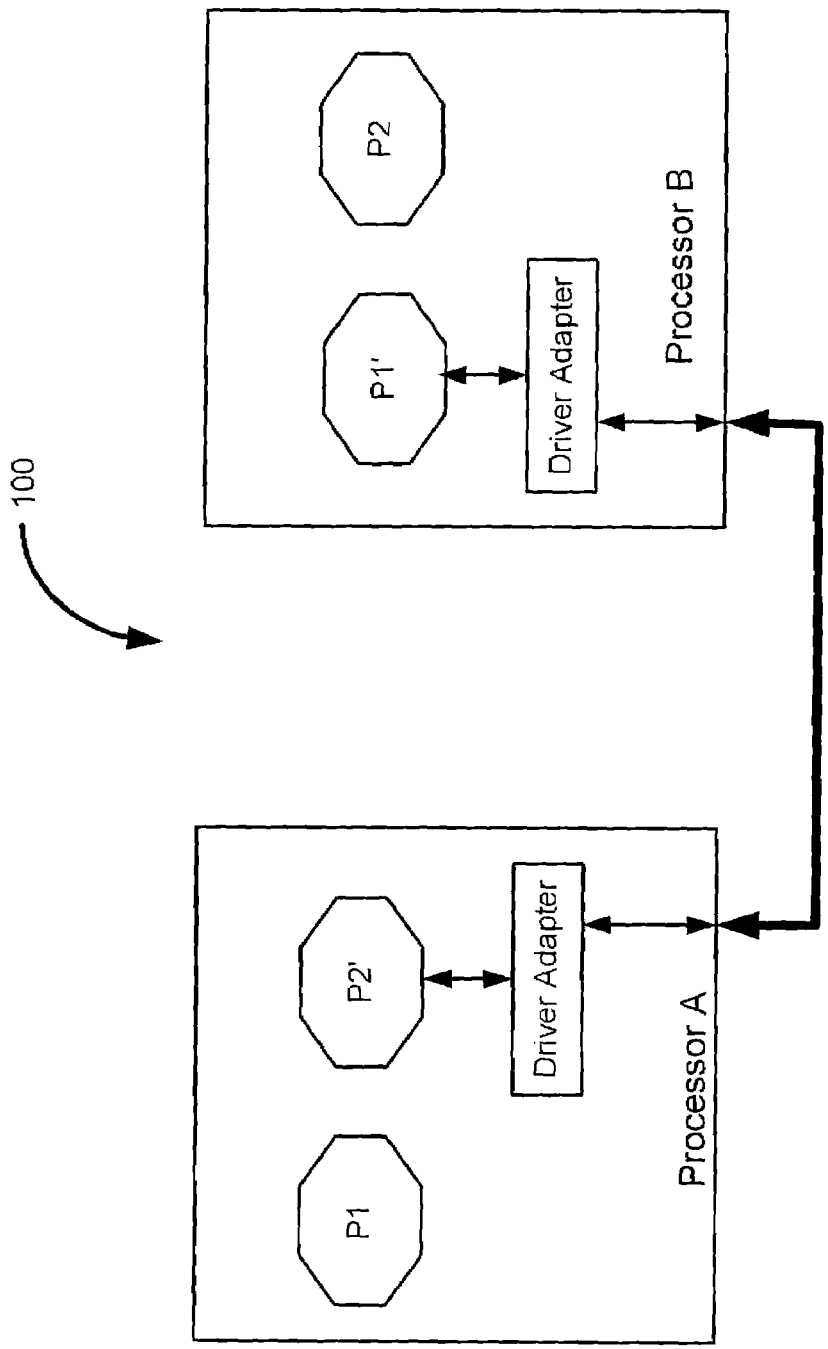
FIG. 2 is a schematic drawing illustrating an example of a VLH solution according to the present invention for solving the problem illustrated in FIG. 1.

In FIG. 2 is shown a schematic drawing of a similar scenario as shown in FIG. 1, but now provided with a virtual link handler 100 having two new processes P1' and P2', respectively, and driver adapters according to the present invention, to allow signal communication between the processes. In systems wherein the present invention is implemented and wherein different types of processors are utilized. the system designer must take into consideration the use of formats of the various processors, such as byte ordering and padding.

Figure 3:
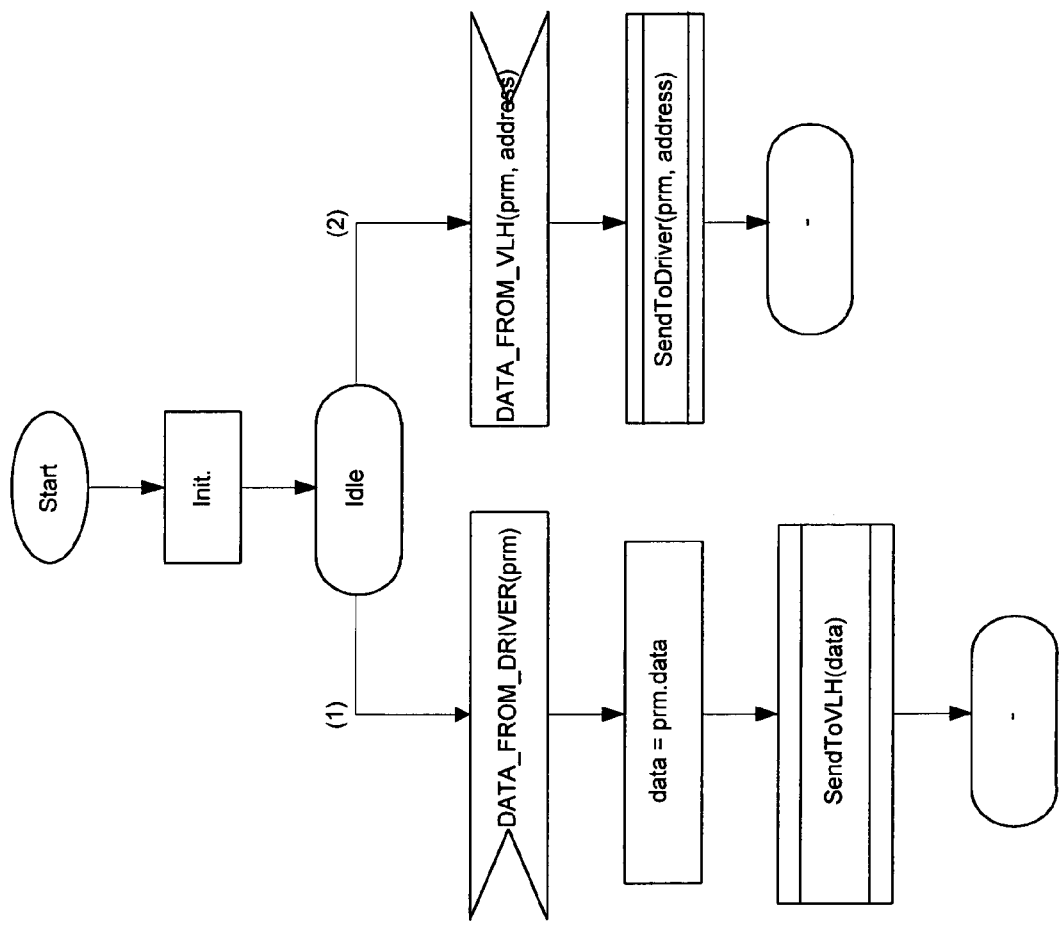
FIG. 3 is a schematic representation of an example of an embodiment of a DA process according to the invention.

With reference to FIG. 3, a symbolic representation of an example of an implementation of a DA process according to the invention is shown. After start and initialization, the process sits in the idle state until a signal event occurs. At signal event, if the signal comes from a driver the course of the process is as indicated by the branch marked (1) below, or, if the signal is transferred to a driver the course of the process is as indicated by the branch marked (2).

Figure 4:
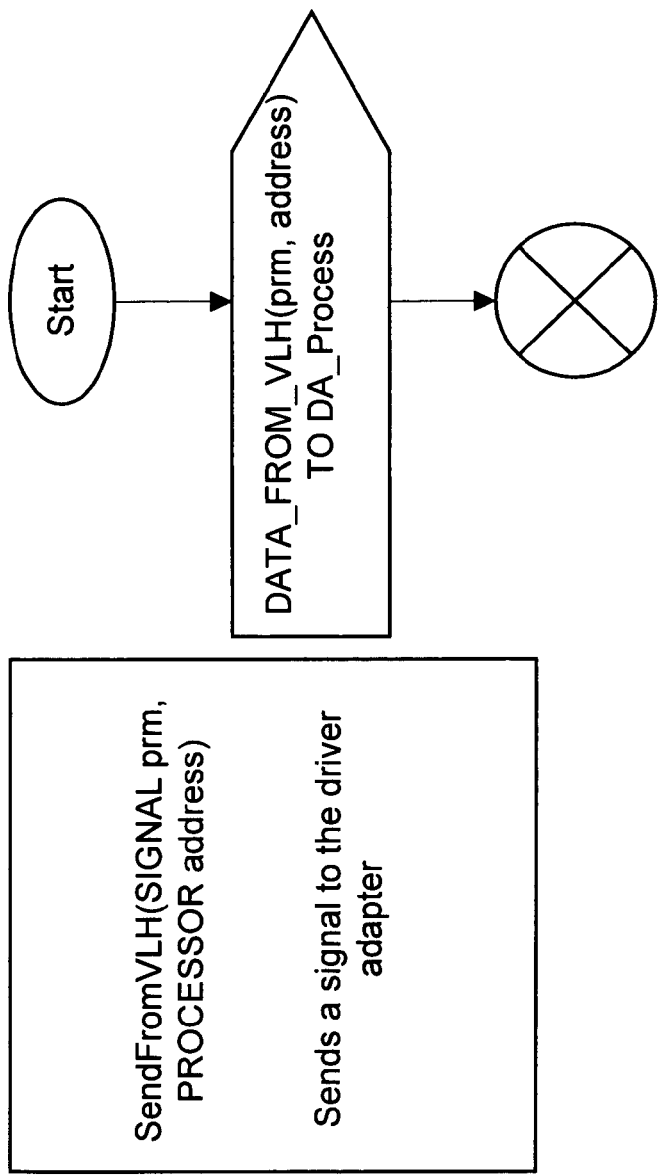
FIG. 4 is a schematic representation of an example of an embodiment of a procedure of a driver adapter according to the invention.

With reference to FIG. 4, a symbolic representation of an example of a procedure in an implementation of the DA according to the invention is shown. The procedure is used to forward a signal to a DA.

Figure 5:
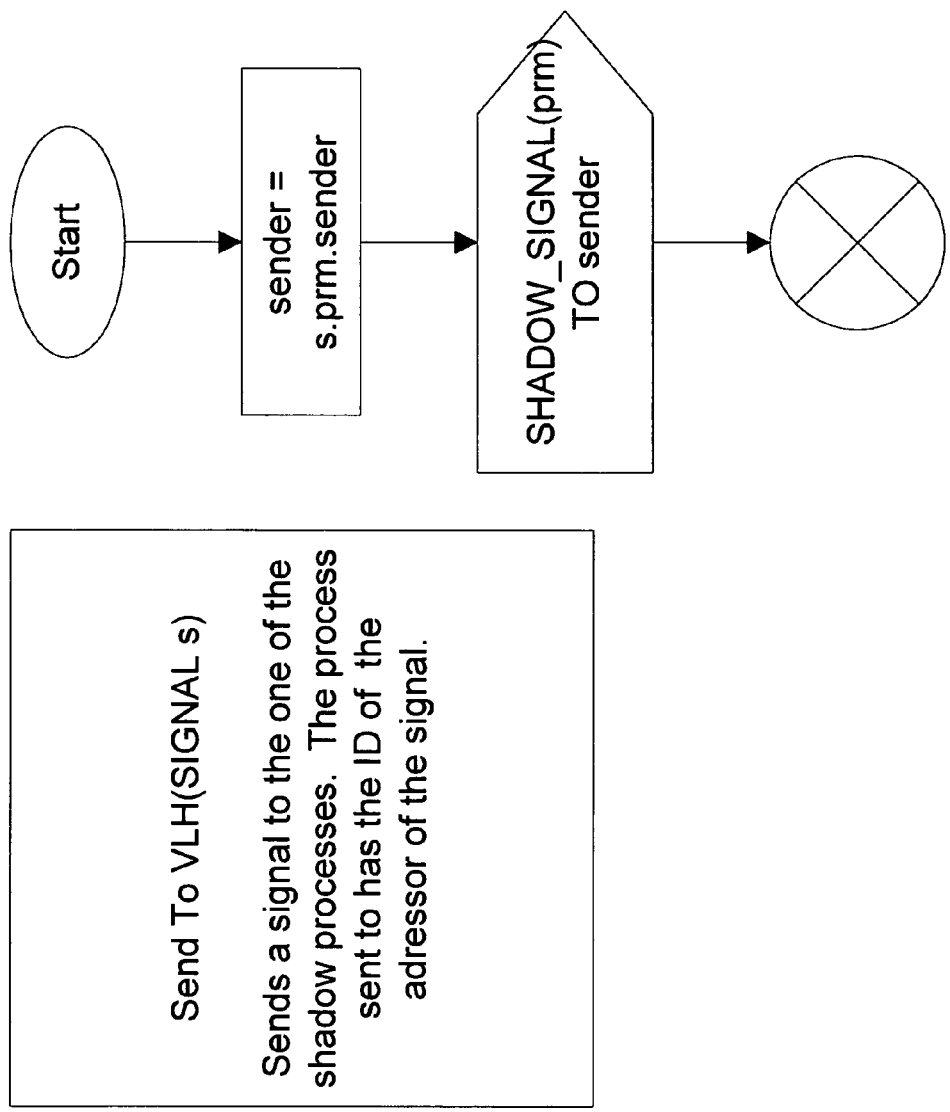
FIG. 5 is a schematic representation of an example of an embodiment of another procedure of a driver adapter according to the invention.

With reference to FIG. 5, a symbolic representation of an example of a procedure in an implementation of the DA according to the invention is shown. The procedure is used to forward a signal from DA to the SP corresponding to the originating process of the signal. The shadow PID (SPID) of that process is extracted from the parameter prm.sender and converted to the local PID using the GetPID( ) function. The SHADOW_SIGNAL should be a unique signal ID that is only sent from the DA to any SP.

Figure 6:
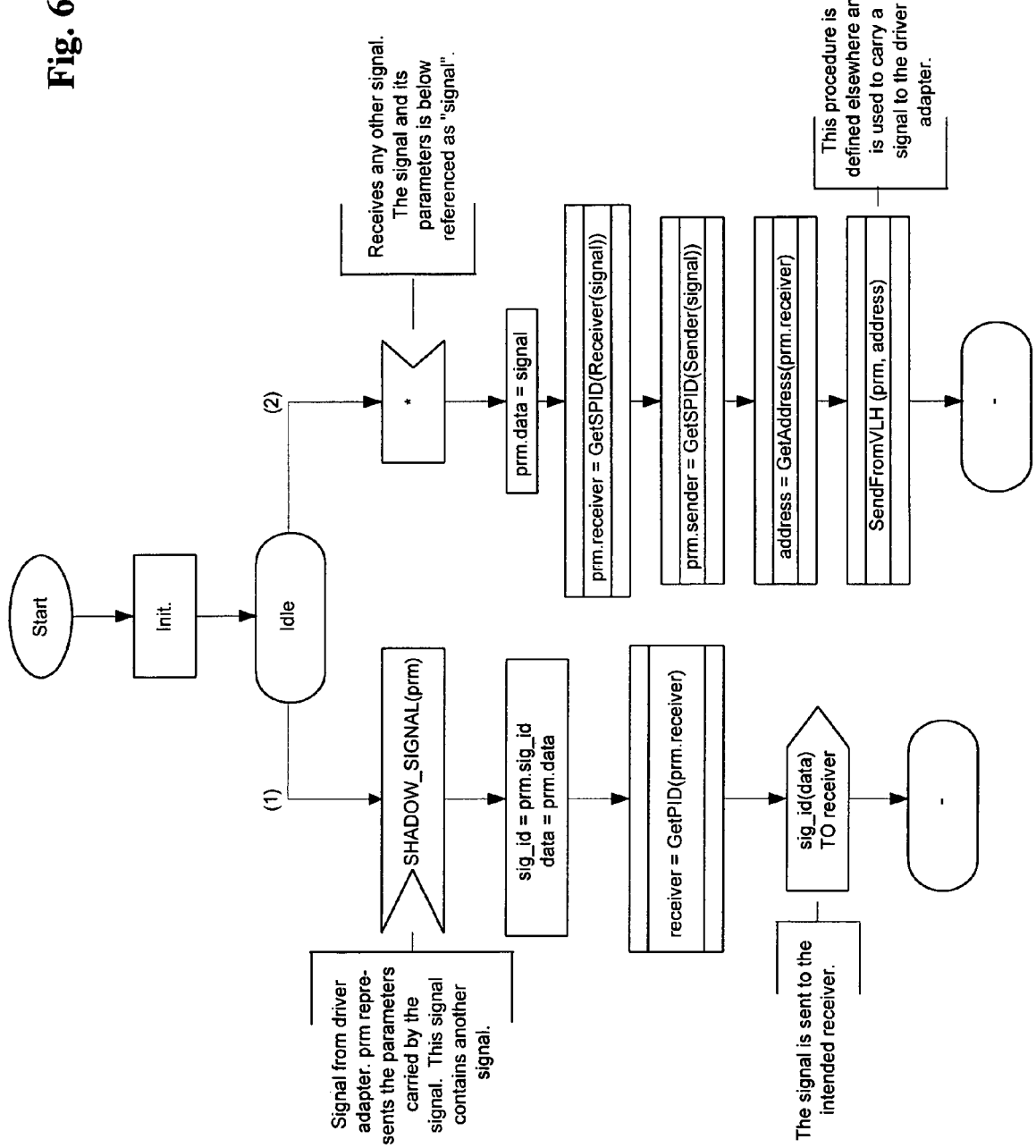
FIG. 6 is a schematic representation of an example of an embodiment of a shadow process according to the invention.

With reference to FIG. 6, a symbolic representation of an implementation of a (generic) SP according to the invention is shown. After start and initialization, the process sits in the idle state until a signal event occurs. At signal event, if the signal comes from a DA the course of the process is as described in the paragraph marked (1) below, for all other signals the course of the process is as described in the paragraph marked (2) below:

(1) When a shadow process receives a SHADOW_SIGNAL, the signal ID and the original signal is extracted from the received signal. Then the intended receiver SPID is extracted from the signal and converted to the local PID using the GetPID( ) function, and the signal is sent to the intended process. Subsequently, the SP goes back to IDLE state;

(2) When any other signal is received the signal is modified: the SP adds both the SPID of the receiver and the SPID of the sender to the signal. The processor address of the receiver of the signal is also found to know which processor the signal should be sent to. The signal is then sent to the driver adapter. The SP goes back to IDLE state.

For the process described in the previous two paragraphs, the following applies:

The GetPID( ) function looks up a PID at the local processor based on the SPID.

The GetSPID( ) function looks up a SPID based on the PID at the local processor.

The GetAddress( ) function looks up the processor address based on the SPID. The processor address identifies the different processors.

To avoid ambiguity or uncertainty, in a preferred embodiment of the present invention the SPID is held unique throughout the system. An alternative solution is to use SPID together with the address of the CPU or computer as a unique identifier of the process.

The Receiver( ) function and the Sender( ) function are OS functions and return the PID of the receiver and the sender, respectively.

Figure 7:
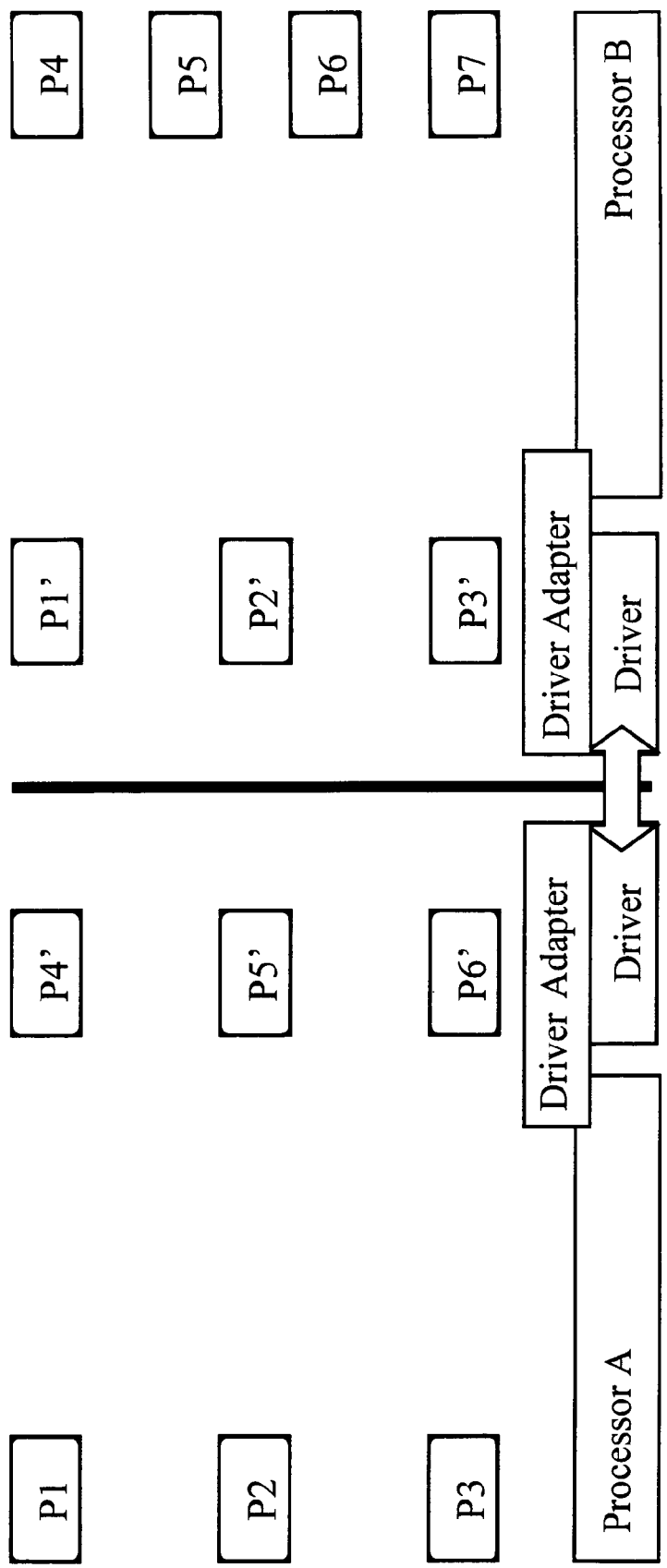
FIG. 7 is a schematic diagram illustrating a system example with a VLH solution according to the present invention.

Another system example is shown in FIG. 7. It is assumed that the system requirements have been made such that the required performance of the example can no longer be met by a system comprising an available single processor. Accordingly, to fit the system to available space and processing power, in the system example shown comprising 7 actual processes in total, the actual processes has been divided into two groups (one for each processor). A first group comprising processes P1, P2 and P3 and a second group comprising processes P4, P5, P6 and P7, are resident and operate on processor A and B, respectively.

Now that the two groups have been separated to be at two different processors, it is needed to re-establish the communication that once was between the processes. This is done, as shown in FIG. 8, by introducing and placing "shadow processes" on each processor, one for each missing "actual" process. The shadow processes are components of the novel VLH which facilitates process signal communication across the system. In the example shown, communication is required between processes P1, P2, P3 of the first group and processes P4, P5, P6 of the second group, respectively. P7 of the second group, however, requires no signal communication with any of the processes of the first group. Accordingly, there is no need for a shadow process for P7.

After introducing the shadow processes, corresponding systems are established on the processors. With this arrangement, an actual process of the first group can find an addressee for signal communication by a shadow process which correspond to an actual processes of the second group, and vice versa.

To allow message communication between the different CPUs, communication means between the two processors are needed. Such communication means could be consisting of drivers and associated physical connections. In order for the shadow processes to make use of such communications means, adapters to the drivers are also needed. The provision of these are also shown in FIG. 7.

Finally, a way to identify the processes between the processors is required. In the system shown, it is assumed that the processors do not have common memory. According to the invention, the way to identify the processors is shown by the reference table example of FIG. 8, corresponding to the system example of FIG. 7.

With reference to FIG. 8, it can be seen that process P7 of the example does not have a shadow PID or a corresponding PID on processor A as process P7 does not require signals communication with any of the processes residing on processor A.

The development of the tables is explained in FIGS. 9a-9c. It is assumed that the system does not have common memory, and the reference table of FIG. 8 is split into two tables, as shown in FIG. 9, and are placed on the respective processors. It can be seen from FIG. 9b that process P7 is removed from the table since there is no communication between the processes of processor A and the process P7. Now we have a reference table that makes it possible to tell which process a signal is sent from and to which process a signal is sent.

The system example of FIG. 7 is a system with only two CPUs or computers. Accordingly, in such systems according to the invention with only two CPUs or computers, the address field can be omitted, and the table may be developed further to the table shown for this example in FIG. 9c. The reason for this is that a signal sent from an actual process to a SP shall always be forwarded to the other "remote" CPU or computer, and a signal is sent from the DA to a SP shall always be forwarded to an actual "local" process.

Figure 10:
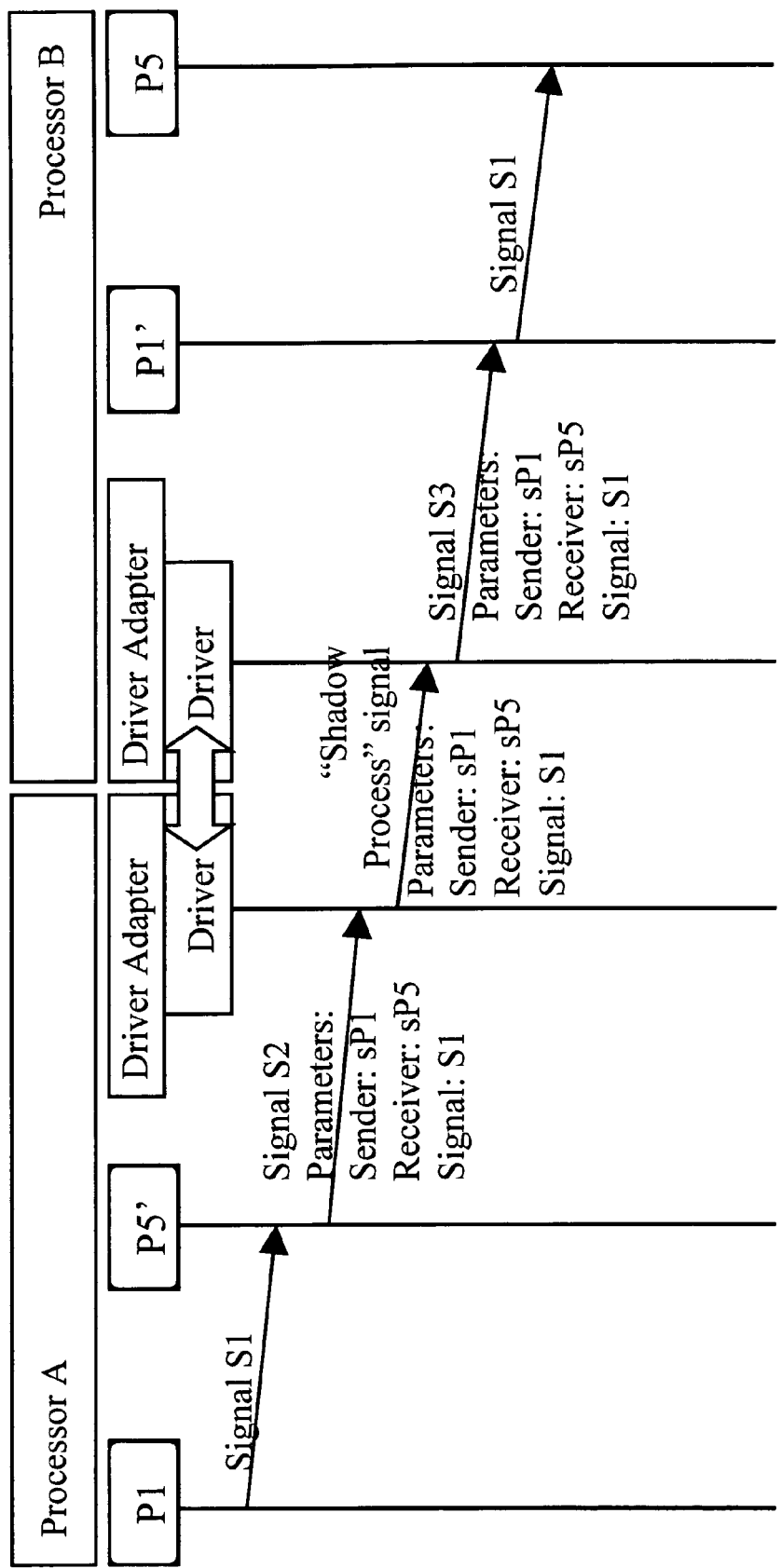
FIG. 10 illustrates a transfer of a signal in one direction in the system example of FIG. 7.

Referring to FIG. 10, an example of a signal communicated from a process of processor A to a process of processor B is shown. Assume that a signal, S1, is to be sent from actual process P1 to actual process P5. Since the shadow process P5' has the same symbolic PID as the actual process P5, the first recipient of the signal will be the shadow process corresponding to P5, namely P5'. P5' will look up the senders local PID and, if necessary, also its own PID. The shadow process uses these data to look up the corresponding processor independent PID, called the shadow PID. All these data are sent through the lower levels, such as the driver adapter and the driver. At the driver level, it is transmitted to the other processor marked with an ID that tells the driver on the other processor that this is a "shadow process" signal. For the data transmission, retransmissions and/or frame numbering may be utilised, independent of the solution according to the invention. When the signal reaches the driver adapter of the other processor, a look-up is done in the table to find which shadow process corresponds to the sender of the signal. The signal S3 (still carrying the sender and receiver information) is then sent to that process. That process is in this case P1'. When the signal reaches P1' the sender and receiver information is removed, and the original signal is sent to the process P5 which is the intended receiver.

Figure 11:
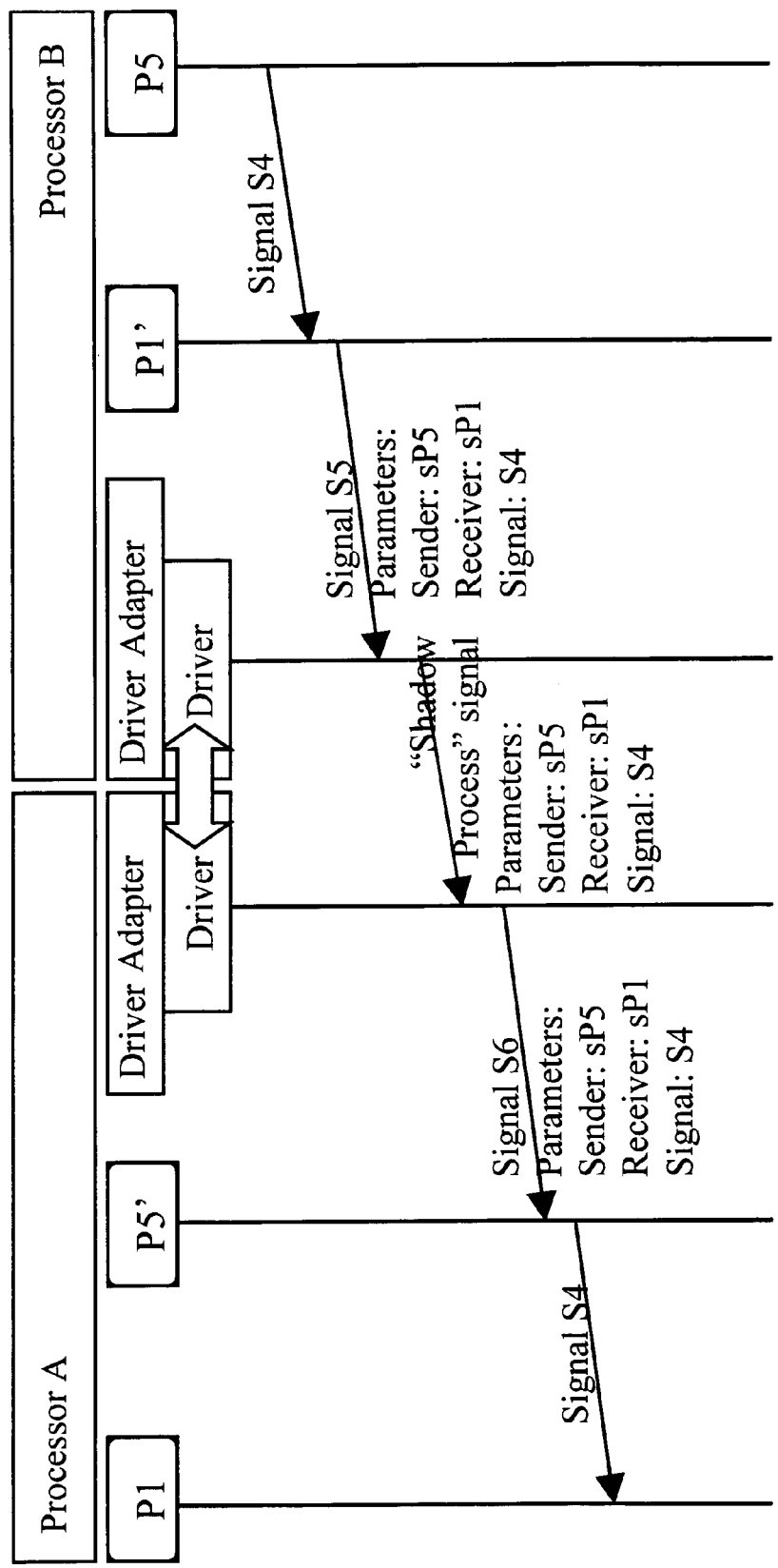
FIG. 11 illustrates a transfer of a signal in another direction in the system example of FIG. 7.

A signal is sent from P1 to P5 has been explained in the foregoing. As shown in FIG. 11, process P5 of the example may respond to the signal of process P1, or a new signal may be sent from P5 to P1. In both cases, the procedure will be similar to the procedure explained in the previous paragraphs, but signals in the example flow in the opposite direction.

It should be noted that signals S2 and S5 may also be a function call into the DA, but is viewed as a signal to show the flow of information.

It should be noted, also, that the response to a signal sent, as described above, is not mandatory in a solution according to the present invention. The two signal sequences described in the foregoing (P1 to P5 and P5 to P1) may therefore be seen as two separate signal sequences.

ADVANTAGES

A signal (sometimes called a message) is used by processes to tell other processes something. The OS or any interrupt routines (not explained) may also send signals, but only processes can receive them. This can be accomplished in multiprocessor, distributed systems wherein the OS of each processor does not provide for communication between different processes that in a static manner are resident of and operating on different processors.

Sharing of the workload is accomplished by allocating different processes in a static manner to different CPUs that operate autonomously and with operating systems (OS) that do not include traditional networking capabilities and associated overhead.

The VLH of present invention allows signal exchange between processes resident of and operating on different processors without modifications to a processor dedicated operating system and without adding to system overhead and complexity.

Also, simplicity is maintained by implementing the invention through utilisation of identical shadow processes. Shadow process identities, however, differ.

The invention claimed is:

1. A distributed data processing system comprising:
at least two interconnected units the two units each comprising one of a central processor unit or a computer, each unit including an independent operating system and a communications driver for inter-unit communications;
wherein a first of the at least two units is arranged for hosting a first actual process and a second of the at least two units is arranged for hosting a second actual process;
a virtual link handler hosted at the first unit and the second unit, the virtual link handler hosting at the first unit a first shadow process representing said second actual process, the virtual link handler hosting at the second unit a second shadow process representing said first actual process, each of said first and second shadow processes being a dummy process unable to provide an essential functionality that is significant of its corresponding actual process, and
a driver adapter provided for the first unit and the second unit for providing inter shadow process signal communication.

2. The system of claim 1, wherein the driver adapter provides inter shadow process signal communication between the respective unit and of a respective communications driver and a respective operating system.

3. The system of claim 1, wherein each process hosted by a respective unit has assigned a locally unique process identifier, and
said first shadow process hosted by said first unit is identified at said first unit by a first shadow process identifier that corresponds to a first actual process identifier of said first actual process hosted by said second unit, and
said second shadow process hosted by said second unit is identified at said second unit by a second shadow process identifier that corresponds to a second actual process identifier of said second actual process hosted by said first unit.

4. The system of claim 1, wherein at least one of said at least two unit is arranged for hosting a plurality of shadow processes that each represents an actual process hosted by respective different ones of a plurality of said at least two units.

5. The system of claim 4, wherein said shadow process identifier is a process identifier uniquely assigned to a respective shadow process throughout the system for providing distributed data processing.

6. The system of claim 5, wherein said shadow process identifier in conjunction with a system address of its hosting unit is a unique system identifier of respective shadow process throughout the system for providing distributed data processing.

7. The system of claim 1, wherein each one of said actual processes is statically associated with or statically resident of a particular one of said at least two units for providing distributed data processing.

8. The system of claim 1, wherein the virtual link handler includes means for maintaining a reference list of associations of actual processes and shadow processes with respective hosting units for providing distributed data processing.

9. The system of claim 8, wherein the virtual link handler includes means for maintaining an address table co-located with each communicating unit, the address table being derived from the reference list and providing a relation between a shadow process and a system address of its hosting unit.

10. The system of claim 1, wherein the virtual link handler includes means for temporarily modifying a signal to be communicated from an actual process hosted by one of said at least two units and targeted for a different actual process hosted by a different one of said at least two units by including in the signal at least the shadow process identifier of its corresponding shadow process that is hosted by said different one of said at least two units.

11. The system of claim 10, wherein the virtual link handler includes means for modifying a signal to be communicated from a shadow process hosted by an associated one of said at least two units and targeted for a different shadow process hosted by a different one of said at least two units by including in the signal at least the process identifier of an actual process that is hosted by said associated one of said at least two units.

12. The system of claim 1, wherein the driver adapter of a respective one of said at least two units is provided with an interface for communicating directly with a shadow process hosted by said respective one of said at least two units.

13. The system of claim 1, wherein the driver adapter of a respective one of said at least two units is provided with an interface for communicating indirectly with a shadow process hosted by said respective one of said at least two units by way of a collocated operating system.

14. The system of claim 1, wherein the driver adapter of a respective one of said at least two units is provided with an interface for communicating directly with a communications driver hosted by said respective one of said at least two units.

15. The system of claim 1, wherein the driver adapter of a respective one of said at least two units is provided with an interface for communicating indirectly with a communications driver hosted by said respective one of said at least two units by way of a co-located operating system.

16. A method for providing inter-unit communication in a system comprising at least two units, the two units each comprising one of a central processor unit or a computer, each unit including an independent operating system and a communications driver for inter-unit communications: the method comprising:

hosting a second actual process at a second of the at least two units;

providing a virtual link handler at the first unit and the second unit and thereby hosting at the first unit a first shadow process representing said second actual process;

hosting at the second unit a second shadow process representing said first actual process, each of said first and second shadow processes being a dummy process unable to provide an essential functionality that is significant of its corresponding actual process, and providing a driver adapter for the first unit and the second unit for providing inter shadow process signal communication.

17. The method of claim 16, providing the driver adapter for providing inter shadow process signal communication between a respective unit being co-located with a respective one of said first and second shadow processes and one of a respective communications driver and a respective operating system.

18. The method of claim 16, further comprising using the virtual link handler for communicating a signal to be transferred from said first actual process to said second actual process by dispatching the signal from the first actual process with the second actual process identifier as the identifier of the destination, receiving the dispatched signal at the second shadow process:

generating by the second shadow process a first amended signal by amending the destination identifier of the signal to identify the first shadow process as the next destination;

forwarding by way of said driver adapter the first amended signal from said first unit to said second unit;

receiving by way of said driver adapter the first amended signal by the first shadow process;

recovering by the first shadow process the signal by amending the destination identifier of the first amended signal to be the second actual process identifier for identifying the second actual process as the next destination, and dispatching the recovered signal from the first shadow process with the identifier of the second actual process as the identifier of the next destination.

* * * * *

UNITED STATES PATENT AND TRADEMARK OFFICE
CERTIFICATE OF CORRECTION

PATENT NO. : 7,426,531 B1
APPLICATION NO. : 09/714956
DATED : September 16, 2008
INVENTOR(S) : Johnsen et al.

It is certified that error appears in the above-identified patent and that said Letters Patent is hereby corrected as shown below:

In Column 7, Line 52, in Claim 13, delete "collocated" and insert -- co-located --, therefor.

In Column 8, Line 11, in Claim 16, after "comprising:" insert -- hosting a first actual process at a first of the at least two units; --, therefor.

Signed and Sealed this

Thirty-first Day of March, 2009

JOHN DOLL
*Acting Director of the United States Patent and Trademark Office*